(12) United States Patent
Berwanger et al.

(10) Patent No.: US 7,039,502 B2
(45) Date of Patent: May 2, 2006

(54) RISK ASSESSMENT FOR RELIEF PRESSURE SYSTEM

(75) Inventors: Patrick C. Berwanger, Houston, TX (US); Robert A. Kreder, Houston, TX (US); Alexander G. Martin, Katy, TX (US)

(73) Assignee: Berwanger, Inc., Houston, TX (US)

( * ) Notice: Subject to any disclaimer, the term of this patent is extended or adjusted under 35 U.S.C. 154(b) by 0 days.

(21) Appl. No.: 10/745,658

(22) Filed: Dec. 29, 2003

(65) Prior Publication Data

Related U.S. Application Data

(63) Continuation of application No. 10/092,658, filed on Mar. 7, 2002, now abandoned.

(60) Provisional application No. 60/275,146, filed on Mar. 12, 2001.

(51) Int. Cl.
*G06F 19/00* (2006.01)

(52) U.S. Cl. .................. 700/301; 700/109; 264/40.1
(58) Field of Classification Search ............. 700/266, 700/109, 310, 173; 264/40.1
See application file for complete search history.

(56) References Cited

U.S. PATENT DOCUMENTS

| 5,200,929 | A | * | 4/1993 | Bowers | 367/38 |
| 5,246,644 | A | * | 9/1993 | Wenskus et al. | 264/40.1 |
| 5,462,120 | A | * | 10/1995 | Gondouin | 166/380 |
| 5,774,372 | A |   | 6/1998 | Berwanger | |

OTHER PUBLICATIONS

"Berwanger Develops Flare QRA Software for Shell Chemical Company," obtained from http://www.berwanger.com/news_arch_2000.html, dated Mar. 10, 2000, 1-pg.

* cited by examiner

*Primary Examiner*—Kidest Bahta
(74) *Attorney, Agent, or Firm*—Wong, Cabello, Lutsch, Rutherford & Brucculeri, LLP

(57) ABSTRACT le;.2qQuantitative Risk Analysis (QRA) can be applied to provide a more realistic assessment of the risk associated with vessel accumulation due to common mode scenarios. The QRA process takes the results of a traditional flare study and QRA inputs such as the frequencies of the common mode scenarios and the layers of protection that will tend to reduce the severity of the common mode scenario, and generates an system risk profile, such as an accumulation versus frequency relationship for each vessel discharging to the relief header. This relationship provides an estimate of the overall risk associated with the relief header system. The QRA program makes the above analysis process possible by automating the generation, execution, and interpretation of the many possible permutations that are required to characterize the system.

25 Claims, 9 Drawing Sheets

General QRA Flowchart

General QRA Flowchart

Construction Of Relief Header Hydraulic Model

QRA Calculation Method

RISK ASSESSMENT FOR RELIEF PRESSURE SYSTEM

CONTINUING APPLICATION INFORMATION

This application is a continuation of the application Ser. No. 10/092,658, filed Mar. 7, 2002, now abandoned, which claims the benefit of U.S. Provisional Application Ser. No. 60/275,146, filed Mar. 12, 2001, and this application claims priority to both of these applications.

FIELD OF THE INVENTION

The present invention relates to a pressure system. Particularly, the present invention relates to assessing risks and probable impact of overpressure in pressure systems.

BACKGROUND OF THE INVENTION

Oil and gas refineries, production units, boilers, pressure vessels, pipelines, and other operating facilities and equipment typically are designed to operate at certain pressures. An overpressure condition can occur under unusual operating conditions, such as a failure of a control valve to appropriately close or open or a failure of a controller to control temperature, pressure, or other operating parameters. Pressure relief devices, such as valves, are present in most processing facilities to limit the maximum pressure in plant equipment to safe levels. Besides relief valves, the operating facility includes other safeguards that can be considered in more accurately depicting an overpressure condition. Such safeguards, include, for example, system interlocks that lock out portions of the operating system while other portions are in use, automatic and manual shut-down controls and valves, various instrumentation that allows system overrides, and other safety items.

Discharges from multiple relief devices coupled to multiple pressure containers can be grouped into a central pipe, commonly known as a pressure relief header or a manifold. Ideally, the header is sized to accommodate multiple relief valves discharging simultaneously. The header is often discharged to an exhaust pipe where the discharge is ignited to create a "flare," as often seen at nights in industrial sectors. Alternatively, the header can discharge to treatment facilities or other appropriate places.

The pressure relief devices are sized for various emergency contingencies that can occur in the facility. In some contingencies (called common mode scenarios), several relief devices may be required to discharge to the relief header simultaneously. Furthermore, the capacity of pressure relief devices can be adversely affected by backpressure that develops in the relief header due to flow. Backpressure is the calculated pressure downstream of the relief device. In general, the higher the backpressure, the greater the pressure increase (accumulation) in the vessel. Therefore, design engineers attempt to determine backpressures that may develop for different common mode scenarios. The ultimate goal is to ensure that the backpressure does not become too high for the relief device to protect the associated piece of equipment. The degree of risk to which a piece of equipment is exposed to can be estimated in terms of accumulation that is defined as the increase in vessel internal pressure over the vessel maximum allowable working pressure (MAWP).

In recent years, software solutions have become available for a given scenario to calculate a particular backpressure. One such program is available from Simulation Sciences, Inc. of Brea, Calif. and is known as "Visual Flare." Such calculations have been used to determine whether a larger header should be designed and installed.

The first step in the traditional design approach is to define credible common mode scenarios based on a review of significant single failure modes (initiating events). Generally, more than one independent failure ("double jeopardy") is not considered credible. The relative frequency of the initiating events is not considered in the evaluation. Once the credible common mode scenarios are defined, the associated relief device discharges are determined. This evaluation is typically done assuming that other protective layers present in the facility that would tend to mitigate the discharges fail to operate. As such, these "worst case" relief requirements are defined through a variety of engineering calculations. Once the discharges are identified, the backpressures in the relief header are determined directly through the use of specialized engineering software. The calculated backpressures are compared to established benchmarks to determine the acceptability of the relief header system.

A fundamental input of the software requires an estimate of how many relief valves may be discharging at any particular moment. The estimate may be based on a global estimation of the system and often is a "seat of the pants" guess at best. For safety, conservative estimates are generally made. Such conservative estimates may lead to a software solution that results in specifying a larger header than is actually needed. In some installations, the existing header may be safely used with various specific adjustments upstream or downstream of the header. A larger header or headers may cost millions of dollars to install in some facilities.

Further, a header may be appropriately sized when the facility is constructed, but inappropriately sized years later due to expansion of the facility. Typically, facilities modify their operating conditions, output, or product mix to adjust for economic conditions. However, often the header is not changed due to the attendant cost. Thus, the safety of the facility can be compromised as its ability to relieve overpressure decreases. A global estimation may indicate an overall problem, but does not indicate where to pinpoint the changes. Thus, again the known software solution may simply indicate a need for a larger header.

In the various scenarios, the relief valves and other safeguards have an individual reliability factor, that is, the probability that the individual safeguard will operate correctly at any particular time of need. The reliability factor of individual safeguards affects in some manner the overall system reliability. In addition to correctly determining multiple flow into headers, one key in an accurate solution is determining that reliability effect. The reliability coupled with flow can more accurately determine whether an unacceptable probability exist that the system will incur an unacceptable vessel accumulation condition.

To date, no known solution exists, other than the present invention, which can account for the probability of performance of the various safeguards and the effect on a system, herein including subsystems. While some software solutions evaluate an overpressure condition, many solutions are based upon a given scenario. No known solution analyzes the probability taken for the multitude of scenarios to determine the amount of risk being taken for an overall system operation.

Therefore, there remains a need for a determination of pressures and flow rates in relief pressure systems based on probabilities of various scenarios.

SUMMARY OF THE INVENTION

The present invention provides a probability or risk assessment of the impact of safeguards on a relief pressure system. The risk assessment system provides an analysis of the operation of the safeguards, the pressure relief valves, the header performance for multiple scenarios, given the risk of individual safeguards or subsystem safeguards, and their impact upon the overall system or subsystem of a facility. Such analysis can provide an overall risk assessment and a determination of header performance. Such information can be used by a facility to determine within a given acceptable probability whether a larger header is actually needed compared to simply conservatively estimated values.

Further, such risk can be determined based upon historical data, engineering judgment, or industry-wide performance capabilities. Thus, a facility may save millions of dollars by undertaking such a risk assessment in some instances. In general, the risk assessment system can estimate an event frequency of failures for given time periods, establish an assessment of the failure probability of safeguards and assess given safeguards for individual containers and/or locations, establish risk target goals for equipment and the overall system, iteratively calculate the frequency of overpressure events with a statistical analysis, and then input such data into additional software, either internal or external to the risk assessment system, that calculates individual and global system performance for all the given scenarios, then analyze the data based upon such risk assessment by accumulated data on whether the risk target goals are met. Such data can be used to determine whether the individual units are global system needs, engineering needs and/or modifications to meet the risk target goals. If the system is modified, additional risk assessment analysis can be performed in like manner until the system meets the risk target goals.

The invention provides a method of assessing risks to pressure equipment associated with at least one pressure relief system having a relief header, comprising identifying one or more relief header inputs associated with the equipment, identifying one or more common mode failure scenarios for the relief header inputs, calculating a first hydraulic model for the one or more common mode failure scenarios, defining a risk acceptance criteria for an accumulation in one or more members of the equipment associated with the relief header inputs, defining initiating events frequency of occurrence for one or more common mode failure scenarios, determining at least one of the risk acceptance criteria is not met by the first hydraulic model, defining a probability of failure for one or more protection systems associated with the equipment; and calculating an output by correlating an accumulation of the one or more members of the equipment with the frequency of occurrence.

The invention further provides a method of assessing risks to pressure equipment associated with at least one pressure relief system having a relief header, comprising identifying one or more relief header inputs associated with the equipment, identifying at least one common mode failure scenario for the relief header inputs, calculating a first hydraulic model for the at least one common mode failure scenario, defining a risk acceptance criteria for an accumulation in the equipment associated with the relief header inputs, defining initiating events frequency of occurrence for the at least one common mode scenario, determining whether the risk acceptance criteria are met by the first hydraulic model.

The invention also provides a system for assessing risks to pressure equipment associated with at least one pressure relief system having a relief header, comprising an electronic processor, a memory coupled to the electronic processor, the memory containing one or more programs to be processed by the electronic processor, the one or more programs being adapted to use input data for identified relief header inputs, identified common mode failure scenarios for the relief header inputs, defined risk acceptance criteria for an accumulation in the equipment associated with the relief header inputs; and defined initiating events frequency of occurrences for the common mode scenarios, defined probability of failure for one or more protection systems coupled to one or more of the relief header inputs, calculate a first hydraulic model for at least one of the common mode failure scenarios, automatically calculate probability of failures for combinations of protection systems associated with the relief header inputs; and automatically correlate an accumulation of one or more members of the equipment with the frequency of occurrences; and an output element coupled to the memory for producing an output of the correlation of the accumulation of one or more members of the equipment with the frequency of occurrences.

BRIEF DESCRIPTION OF THE DRAWINGS

A more particular description of the invention, briefly summarized above, may be had by reference to the embodiments thereof that are illustrated in the appended drawings and described herein. It is to be noted, however, that the appended drawings illustrate only some embodiments of the invention and are therefore not to be considered limiting of its scope, because the invention may admit to other equally effective embodiments.

DETAILED DESCRIPTION OF A PREFERRED EMBODIMENT

Figure 1:
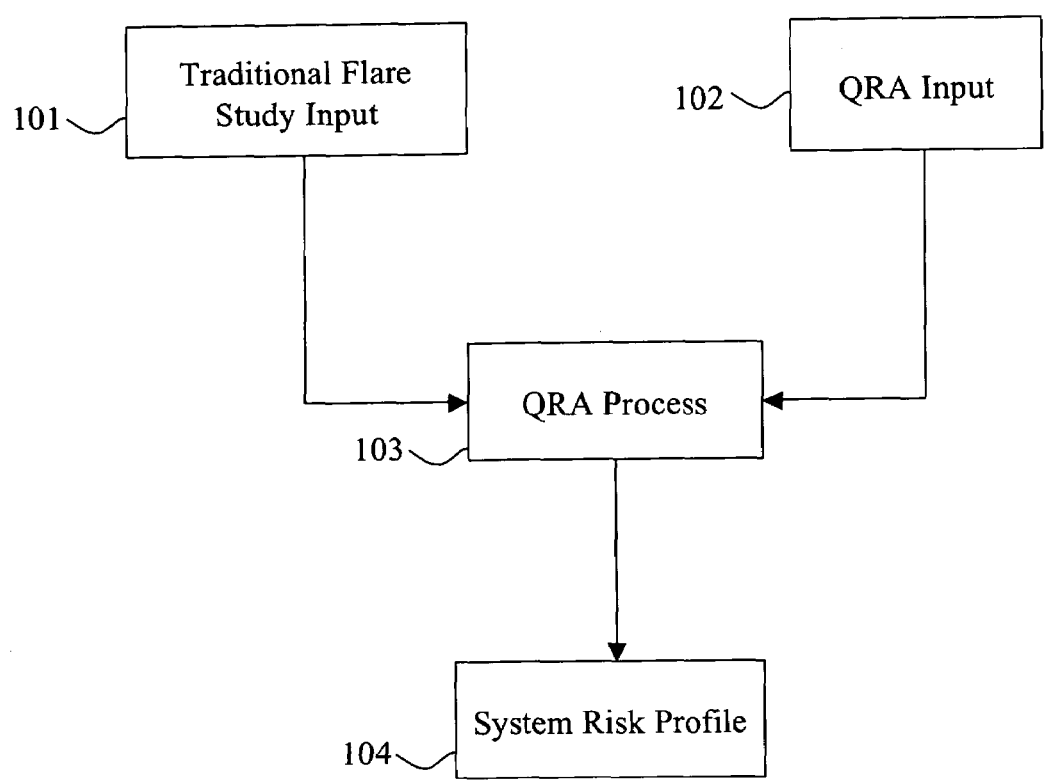
FIG. 1 is an overall schematic flow chart of a system and method of the invention.

FIG. 1 is an overall schematic flow chart of a system and method of the invention.

Quantitative Risk Analysis (QRA) can be applied to provide a more realistic assessment of the risk associated with vessel and other equipment accumulation due to common mode scenarios. The QRA process, 103, takes the results of a traditional flare study, 101, and QRA inputs, 102, such as the frequencies of the common mode scenarios and the layers of protection that will tend to reduce the severity of the common mode scenario, and generates an system risk profile, 104, such as an accumulation versus frequency relationship for each vessel discharging to the relief header.

As stated above, this relationship provides an estimate of the overall risk associated with the relief header system.

The Flare QRA computer program produced by Berwanger, Inc., makes the above analysis process possible by automating the generation, execution, and interpretation of the many possible permutations that are required to characterize the system.

Figure 2:
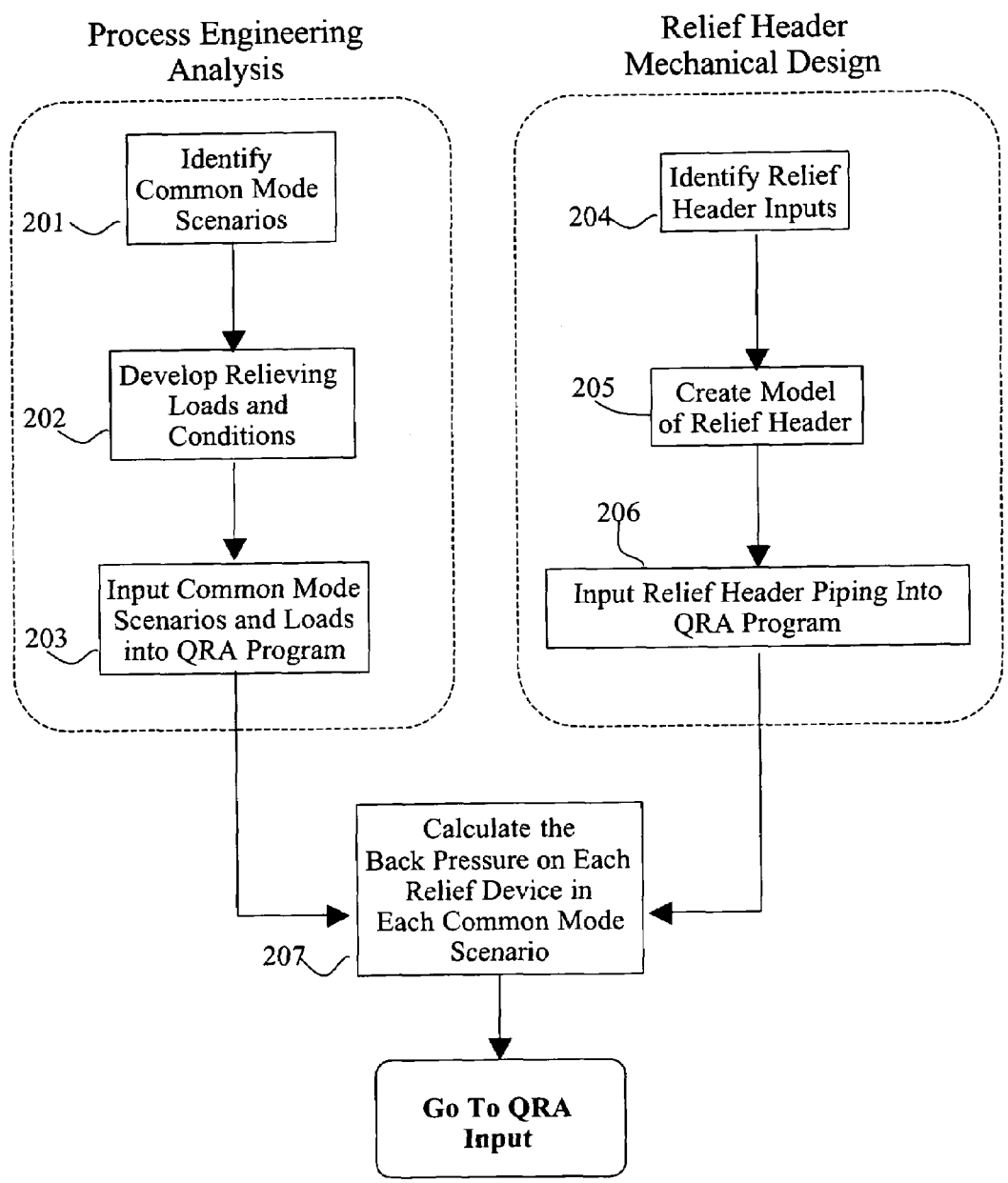
FIG. 2 is a schematic of various inputs relevant to the system.

FIG. 2 is a schematic of various inputs relevant to the system. The flow chart sequence can specifically be altered and the flow chart can vary according to the complexity of the system. Thus, the flow charts contained herein are exemplary of a general process in characterizing a pressure relief system and associated equipment.

Relief Header Mechanical Design

Identify Relief Header Inputs:

In step 204, the user generally identifies all sources that discharge to the relief header. Inputs to the relief header can be relief devices, pressure control valves, depressuring valves, or manually operated valves. The user may obtain information on the relief header inputs from plant relief device databases, Piping and Instrumentation Diagrams (P&IDs), or a physical survey of the facility. There is no practical limit to the number of input locations supported by the program.

Create Sketch of Relief Header:

In step 205, the user can create a drawing of the relief header and uses the drawing to create an electronic model of the relief header in the QRA program. The drawing of the relief header should show the piping configuration, including distances, elevation changes, pipe sizes and fittings, from all identified relief header input devices to the discharge location of the system. The drawing of the relief header is typically drawn by visually verifying each section of the relief header at the plant location.

Input Relief Header Piping into QRA Program:

In step 206, using the drawing of the relief header, the user then creates an electronic representation of the relief header in the QRA program. The user enters the piping configuration, including distances, elevation changes, pipe sizes and fittings, from each relief header input to the relief header. The user then inputs the piping configuration of the relief header from the end of the header to the discharge location of the system. In this way, the user creates an electronic representation of the relief header in the QRA program.

Process Engineering Analysis

Identify Common Mode Scenarios:

In step 201, the user identifies a set of common mode scenarios. A common mode scenario is triggered by a single initiating event (i.e. power failure, external fire, etc.) that results in multiple discharges to the relief header. Common mode scenarios are identified using a combination of engineering judgment and past plant experience. Note that there is no practical limit to the number of common mode scenarios supported by the program.

For example, an engineer might use engineering judgment to determine that three relief devices would be expected to relieve in the event of a partial power failure to a particular bus caused by the failure of an individual circuit breaker. In another example, plant personnel might identify a particular zone in the plant where pool fires commonly affect multiple vessels and result in multiple discharges to the relief header from relief devices on the affected vessels. Both examples are considered credible common mode scenarios.

Individual relief scenarios (defined as discharges to the relief header from a single relief header input) are not commonly analyzed in the context of relief header analyses because each relief header input is typically analyzed individually prior to evaluation of the common mode scenarios.

Develop Relieving Loads and Conditions:

In step 202, for each common mode scenario, the user enters the relief header inputs expected to relieve to the relief header. The user also inputs the expected relief rate (lb/h), temperature, fluid composition and ratio of specific heats (typically referred to as "k" or "Cp/Cv") for each relief header input in each common mode scenario. Other values can be entered as necessary and the above list is exemplary. The relieving loads may be calculated using commercial process simulation software such as HYSYS, or by utilizing industry-wide standard calculations, such as those found in API 520 Sizing, Selection, and Installation of Pressure-Relieving Devices in Refineries and API 521 Guide for Pressure-Relieving and Depressuring Systems. The user's engineering judgment is utilized to determine the most appropriate calculation method for each piece of equipment. The relieving conditions are calculated by inputting the fluid composition, temperature and pressure into a commercial process simulator to generate the compressibility factor and ratio of specific heats. Note that the relief load, temperature, fluid composition and "k" can be specified differently for each scenario.

For example, in the event of a total power failure, a release of a certain relief load lb/h could be expected from a particular relief device associated with a particular member of equipment. Parameters of the relieving conditions could include a particular relieving pressure, a relieving temperature, a fluid composition, and a ratio of specific heats, as would be known to those with ordinary skill in the art.

Relieving Pressure=135 psig

Relieving Temperature=245 F

Fluid composition=30 mole % propane, 20 mole % n-butane, 50% i-butane

Ratio of Specific Heats (k)=1.23

Further, FIG. 2 includes a step 207 for calculating a backpressure.

Calculate the Back Pressure on Each Relief Device in Each Common Mode Scenario:

After completing steps 201–206 and as depicted in step 207, the user can run a hydraulic model of the relief header for each common mode scenario to determine the back pressure on each relief header input. A pressure profile in the relief header is obtained by solving the hydraulic model using a commercial hydraulic analysis software package such as Visual Flare™. The user can execute a separate run for each common mode scenario using the corresponding relief loads and conditions for that scenario. The program stores the backpressure data generated for each relief header input for further analysis, as described in the Monte Carlo Analysis Method section in reference to FIG. 6. No credit for mitigating layers of protection is taken in this step. Therefore, this run generally represents an upper limit to the vessel or other equipment accumulations or "worst case".

QRA Input

Figure 3:
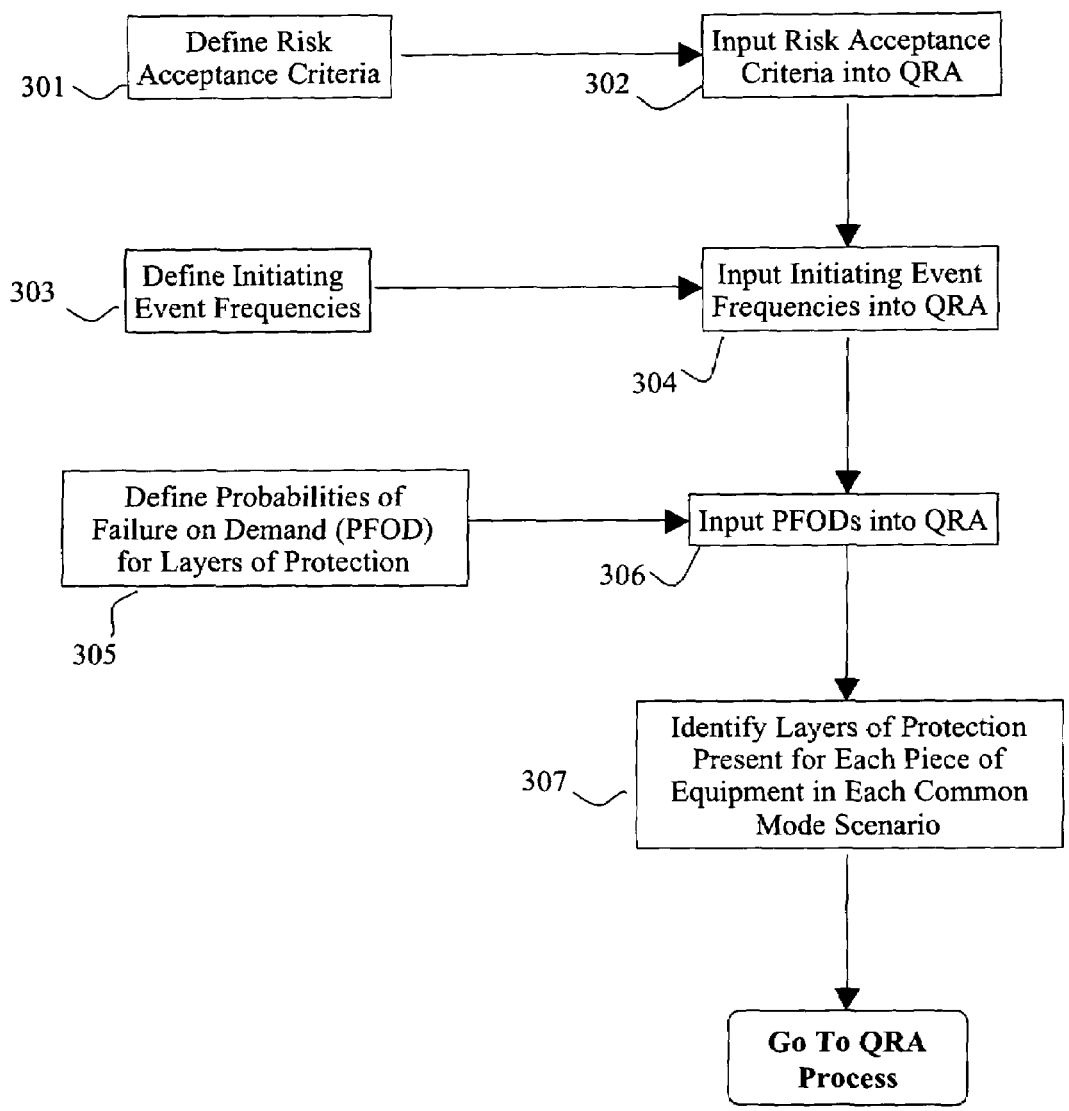
FIG. 3 is a schematic flow chart of additional input used in the system and method of the invention.

FIG. 3 is a schematic flow chart of additional input used in the system and method of the invention.

Define Risk Acceptance Criteria:

In order to perform a QRA, the user inputs values for the Risk Acceptance Criteria (RAC). The RAC may be obtained from corporate risk criteria or from typical criteria applied in the industry. The RAC is generally defined as a time interval (such as years) for which a certain level of vessel accumulation, as defined in ASME Boiler and Pressure Vessel Code, Section VIII, is acceptable. A conceptual example of risk acceptance criteria is shown below for exemplary purposes and without limiting the system and method:

| Vessel Accumulation Exceeds | Risk Target (Years between Occurrences) |
| --- | --- |
| 21% | 1 |
| 30% | 20 |
| 50% | 50 |
| 75% | 100 |
| 100% | 500 |
| 150% | 1,000 |
| 200% | 10,000 |
| 250% | 20,000 |
| 300% | 50,000 |

The QRA program allows the specification of both individual risk acceptance criteria (for individual equipment, such as vessels) and aggregate risk acceptance criteria (which applies to the "system" of equipment attached to the relief header) to create risk evaluation of one or more groups of equipment or for the whole set of equipment associated with the pressure relief system.

A conceptual example of aggregate risk acceptance criteria is shown below:

| Vessel Accumulation Exceeds | Risk Target (Years between Occurrences) |
| --- | --- |
| 21% | 1 |
| 30% | 5 |
| 50% | 10 |
| 75% | 20 |
| 100% | 50 |
| 150% | 100 |
| 200% | 1,000 |
| 250% | 10,000 |
| 300% | 20,000 |

In general, the user may choose to accept lower intervals for the aggregate risk criteria because it represents the entire "system" of vessels associated with the relief header. The same level of accumulation applied to the "system" of associated vessels typically represents a lower risk than for an individual vessel.

Input Risk Acceptance Criteria:

In step 302, user inputs the Risk Acceptance Criteria, as defined in step 301, into the QRA program. The data is entered as an interval (years) for which a certain level of vessel accumulation is acceptable. There is no practical limit to the size of the database containing the risk acceptance criteria; consequently, the user may specify as many vessel accumulation ranges as are deemed necessary.

Define Initiating Event Frequencies:

In step 303, the user defines the frequency at which each common mode scenario is expected to occur. This determination is made by reviewing the initiating event that leads to the common mode scenario. The initiating event frequency may be determined from historical plant data, published reliability data or engineering analysis. For example, a total power failure may be expected to occur once every 20 years (frequency=0.05/year).

Input Initiating Event Frequencies:

In step 304, the user inputs the initiating events frequencies, as defined in step 303, generally for each common mode scenario into the QRA program. The user inputs an initiating event frequency for each common mode scenario identified in step 201, FIG. 2.

Define the Probability of Failure on Demand (PFOD Values for Layers of Protection:

In order to model the performance of mitigating layers of protection, the user defines the Probability of Failure on Demand (PFOD) for all potential layers of protection as shown in step 305. Layers of protection initiate mitigating action that serve to reduce or eliminate a discharge to the relief header from the relief location in question. For example, a spare pump auto-start may serve to keep a surge vessel from overfilling and thus eliminate a discharge to the relief header in the event that the primary pump failed. The PFOD is used in the QRA program to determine the probability that each layer of protection will operate when required.

The table below lists some general layers of protection and theoretical PFODs that have been used with the QRA program:

| Typical Layers of Protection | PFOD |
| --- | --- |
| SIL-III | 0.1% |
| SIL-II | 1% |
| SIL-I | 10% |
| Failure of conventional instrumentation | 67% |
| Failure of operator intervention | 75% |
| Failure of high pressure override | 5% |
| Failure of spare pump auto-start | 10% |
| A given pump/spare will be in operation | 50% |

Input Probabilities of Failure on Demand:

In step 306, the user inputs the PFODs, as defined in step 305, into the QRA program. The PFODs input in this step will be used as the default PFODs for the given layers of protection by the program when determining if a given layer of protection will operate.

For example, a high pressure override associated with any piece of equipment in any CMS will have a default PFOD as identified in the Define the PFOD Values for Layers of Protection tabular example above, such as the exemplary 5%. However, note that the default PFODs may be overwritten by the user for each individual relief location in each common mode scenario, if so desired.

Identify Layers of Protection that Mitigate Relief Loads:

In step 307, for each device that discharges to the relief header, the user may identify layers of protection that mitigate the expected relief load either partially or totally. This task is accomplished by analyzing every vessel in every CMS to determine if mitigating layers of protection are present.

The individual layers of protection may reduce the relief load or totally eliminate the load. If there are multiple combinations of layers of protection, the user may specify different relief loads for the different combinations of layers of protection. The example below illustrates the concept of layers of protection and is only illustrative, as the valves, outcomes, failure modes can vary among pressure relief systems.

Example: In this example, a particular piece of equipment has two layers of protection that would serve to reduce the discharge to the relief header. A pump auto-start is present that has a PFOD of 10% and a high-pressure override that has a PFOD of 5%. The table below lists the possible outcomes and the associated overall probabilities.

| Possible Outcomes | Load to Relief Header | Overall Probability |
|---|---|---|
| Scenario 1 HP Override Operates Pump Auto-Start Operates | 5,000 lb/hr | 0.855 |
| Scenario 2 HP Override Operates Pump Auto-Start Fails | 35,000 lb/hr | 0.095 |
| Scenario 3 HP Override Fails Pump Auto-Start Operates | 35,000 lb/hr | 0.045 |
| Scenario 4 HP Override Fails Pump Auto-Start Fails | 80,000 lb/hr | 0.005 |

The overall probabilities listed in the table above are quantified as detailed below.

Scenario 1 overall probability=(1−HP override failure probability)*(1−pump autostart failure probability)

=(1−0.05)*(1−0.10)=0.855

Scenario 2 overall probability=(1−HP override failure probability)*(pump autostart failure probability)

=(1−0.05)*0.10=0.095

Scenario 3 overall probability=(HP override failure probability)*(1−pump autostart failure probability)

=0.05*(1−0.10)=0.045

Scenario 4 overall probability=(HP override failure probability)*(pump autostart failure probability)

=0.05*0.10=0.005

Sum of all overall=0.855+0.095+0.045+0.005=1 probabilities

QRA Process

Figure 4:
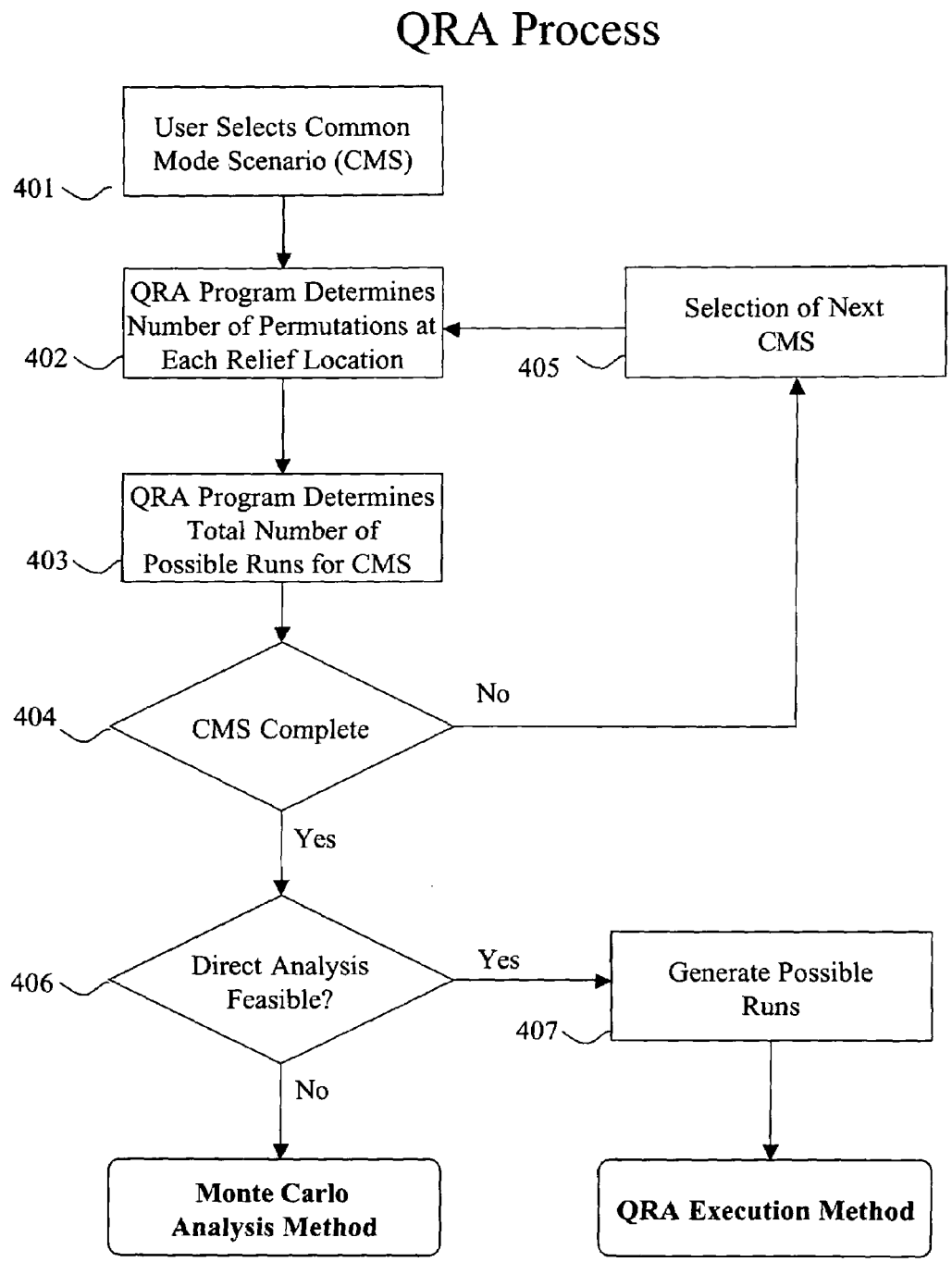
FIG. 4 is a schematic flow chart illustrating processing of input data in the QRA process.

FIG. 4 is a schematic flow chart illustrating processing of input data in the QRA process.

User Selects Common Mode Scenario:

In step 401, the user selects the first common mode scenario for analysis. Due to the fact that each common mode scenario is independent, the QRA program can analyze each common mode scenario sequentially.

ORA Program Determines Number of Permutations at Each Relief Location:

In step 402, the identification of layers of protection, as described in 307, at each relief location for each common mode scenario allows the quantification of the total number or permutations of possible outcomes. For a given common mode scenario, the QRA program can calculate the total number of outcomes possible at each relief location. This is accomplished by reviewing the various layers of protection and the impact on the relief load at each location.

In the example shown above in the Identify Layers of Protection That Mitigate Relief Loads section, four possible combinations of protection layers are defined; however, two of these combinations (Run 2 and Run 3) result in the same relief load to the relief header. As such, these runs can be combined by summing the probabilities of Run 2 and Run 3. To summarize, the possible outcomes and associated probabilities are as follows:

Run 1 overall probability is 0.855 and results in a relief load of 5,000 lb/hr

Run 2 overall probability is 0.140 (0.095+0.045) and results in a relief load of 35,000 lb/hr Run 3 overall probability is 0.005 and results in a relief load of 80,000 lb/hr This process is generally repeated at each relief location to define the total number of outcomes at each relief location for the common mode scenario being considered.

ORA Program Determines Total Number of Possible Runs for CMS:

In step 403, the QRA program calculates the total number of possible runs for the entire common mode scenario. The total number of possible runs is calculated using the number of outcomes at each location determined in step 402, because the layers of protection at each location are assumed to function independently. For example, if five locations were involved in the common mode scenario and three possible outcomes existed at each of the five locations, the total number of possible outcomes for the entire common mode scenario would be $3^5$ or 243.

All Common Mode Scenarios Complete:

If more than one common mode scenario has been identified in step 201 in FIG. 2, the process of identifying the total number of possible runs must be repeated for each common mode scenario.

If all common mode scenarios have not been analyzed to determine the total number of possible runs, as described in the previous sections, the QRA program may be configured to automatically select the next common mode scenario or the user may manually select the next incomplete common mode scenario as shown in step 405.

After the common mode scenarios have been analyzed in steps 401–405, a database of common mode scenarios with the total number of possible runs for each is stored in the QRA program.

Analysis of All Runs Feasible:

In step 406, two methods are available to execute the QRA program depending on the complexity of the system and desired confidence level for the results. As the example above in the QRA Program Determines Total Number of Possible Runs for CMS section shows, a number of outcomes are possible for each relief location associated with each common mode scenario. As such, the number of permutations and therefore the time required to perform the QRA analysis quickly increases as layers of protection are added. In the event that time is available to analyze each permutation, the QRA analysis can be performed directly by analyzing each permutation and directly computing the vessel accumulation versus frequency for each vessel, as shown in step 407. If the time required to execute each possible run for a given common mode scenario is acceptable, then detailed statistical analysis of confidence intervals (as described for Monte Carlo herein) is not required. The QRA program generates each possible combination of outcomes and stores the runs for analysis as described in the Risk Evaluation section.

However, if the user determines that the number of permutations is too great to practically allow analysis of every permutation, Monte Carlo simulation techniques are applied to complete the QRA as described in the Monte Carlo Analysis section. Note that the common mode scenarios are independent. Therefore, the decision on analysis technique can be made on a scenario-by-scenario basis, if desired.

Generate Possible Runs:

The QRA program can generate the total number of possible runs for the given common mode scenario as described in step 403. The QRA program then generates a database of all possible runs that contains the relief loads for each relief location for each run. The total number of possible runs that are analyzed equals the number generated in step 403. The QRA program repeats the process if necessary for multiple common mode scenarios.

An example of a simple common mode scenario is as follows:

| Relief Location | Outcome 1 Relief Load | Outcome 1 Probability | Outcome 2 Relief Load | Outcome 2 Probability | Outcome 3 Relief Load | Outcome 3 Probability |
|---|---|---|---|---|---|---|
| #001 | 50,000 | 0.05 | 25,000 | 0.1 | 0 | 0.85 |
| #002 | 100,000 | 0.01 | 60,000 | 0.5 | 0 | 0.49 |
| #003 | 35,000 | 0.2 | 0 | 0.8 | N/A | N/A |

The input above results in 18 different runs as calculated by the methodology described in step 403. The QRA program generates the run data for each of the possible runs for analysis utilizing a simple algorithm and it also computes the probability of each run as the product of the individual probabilities for each relief location, as shown in the example below:

| Run | Load at #001 | Load at #002 | Load at #003 | Total Load | Run Probability |
|---|---|---|---|---|---|
| 1 | 50,000 | 100,000 | 35,000 | 185,000 | 0.0001 |
| 2 | 50,000 | 100,000 | 0 | 150,000 | 0.0004 |
| 3 | 50,000 | 60,000 | 35,000 | 145,000 | 0.005 |
| 4 | 50,000 | 60,000 | 0 | 110,000 | 0.02 |
| 5 | 50,000 | 0 | 35,000 | 85,000 | 0.0049 |
| 6 | 50,000 | 0 | 0 | 50,000 | 0.0196 |
| 7 | 25,000 | 100,000 | 35,000 | 160,000 | 0.0002 |
| 8 | 25,000 | 100,000 | 0 | 125,000 | 0.0008 |
| 9 | 25,000 | 60,000 | 35,000 | 120,000 | 0.01 |
| 10 | 25,000 | 60,000 | 0 | 85,000 | 0.04 |
| 11 | 25,000 | 0 | 35,000 | 60,000 | 0.0098 |
| 12 | 25,000 | 0 | 0 | 25,000 | 0.0392 |
| 13 | 0 | 100,000 | 35,000 | 135,000 | 0.0017 |
| 14 | 0 | 100,000 | 0 | 100,000 | 0.0068 |
| 15 | 0 | 60,000 | 35,000 | 95,000 | 0.085 |
| 16 | 0 | 60,000 | 0 | 60,000 | 0.34 |
| 17 | 0 | 0 | 35,000 | 35,000 | 0.0833 |
| 18 | 0 | 0 | 0 | 0 | 0.3332 |

Construction of Relief Header Hydraulic Model

Figure 5:
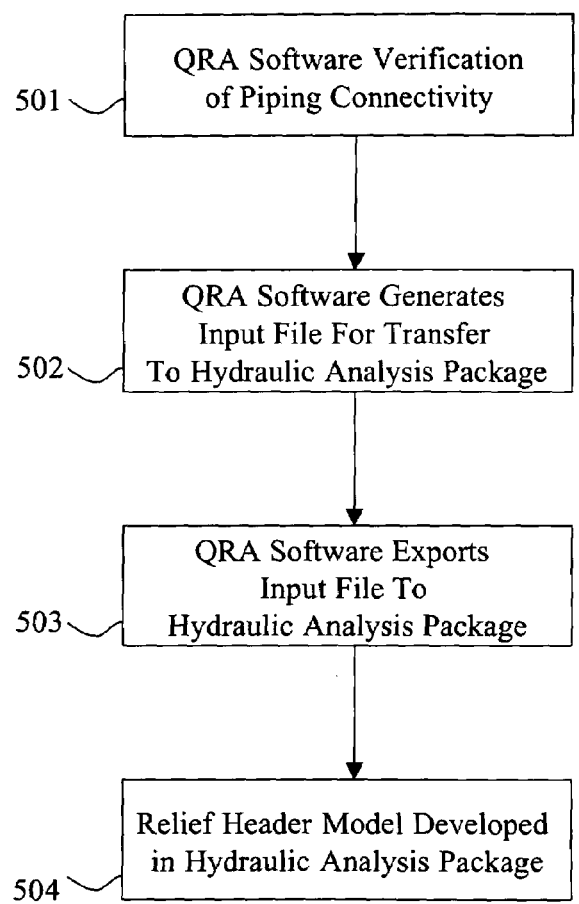
FIG. 5 is a schematic flow chart of the modeling of the pressure relief system.

FIG. 5 is a schematic flow chart of the modeling of the pressure relief header. Regardless of analysis technique decided in steps 406, the relief header network input in the QRA program is transferred to a hydraulic analysis program to generate the hydraulic model. The QRA program currently accomplishes this task through OLE (Microsoft Object Linking and Embedding protocol) automation to Visual Flare™, a commercially available hydraulic analysis software program available from Simulation Sciences. Prior to transferring the input, the QRA program performs verification routines to verify the connectivity of the piping and assist the user in identifying any inappropriate input. It is to be understood that other hydraulic packages with OLE automation could be utilized or the hydraulic model algorithms could be programmed into the QRA program itself. The end result of this step is a hydraulic model that is representative of the relief header piping system. If a separate hydraulic analysis program is used, then some intermediary transfer steps may be used as would be known to those with ordinary skill in the art.

QRA Program Verification of Piping Connectivity:

In step 501, the QRA program evaluates the relief header input information as provided in step 206, FIG. 2, to establish "connectivity" of the entire relief header model from each relief header input, through the relief header, to the discharge location of the system. Establishing "connectivity" is completed by an algorithm as described below. First, the connectivity algorithm verifies that all identified relief header input devices listed in the QRA program have been included in the electronic model of the relief header. If a relief header input device is not connected to the relief header, the QRA program displays an error message that asks the user to add the omitted relief header input to the relief header model. The algorithm then starts at the relief header outlet and constructs all possible routes, through the user-entered flare model, back to each relief header input entered in the QRA program. During this process of constructing all routes, the algorithm eliminates "dead-ends", or routes that do not end at a relief header input, and generates a list of all unique paths from the relief header outlet to each relief header input.

QRA Program Generates Input File for Transfer to Hydraulic Analysis Program:

In step 502, after establishing the connectivity of the entire relief header model in step 501, the QRA program can generate an "input file" in a format recognizable to the particular hydraulic analysis program used which contains the piping configuration information for the entire relief header. This file can be utilized to build a hydraulic model of the relief header in the hydraulic analysis program.

ORA Program Exports Input File to Hydraulic Analysis Program:

In step 503, the QRA program can transfer the "input file" generated in step 502 into the hydraulic analysis program using OLE automation.

Relief Header Model Developed in Hydraulic Analysis Program:

In step 504, after the "input file" is imported into the hydraulic analysis program, the hydraulic analysis program whether separate or contained within the QRA program reconstructs a model of the relief header from the input file created by the QRA program in step 502. The model of the relief header is used for hydraulic analysis of individual runs by the QRA program, which will be described in further detail in steps 705–713.

Monte Carlo Analysis Method

Figure 6:
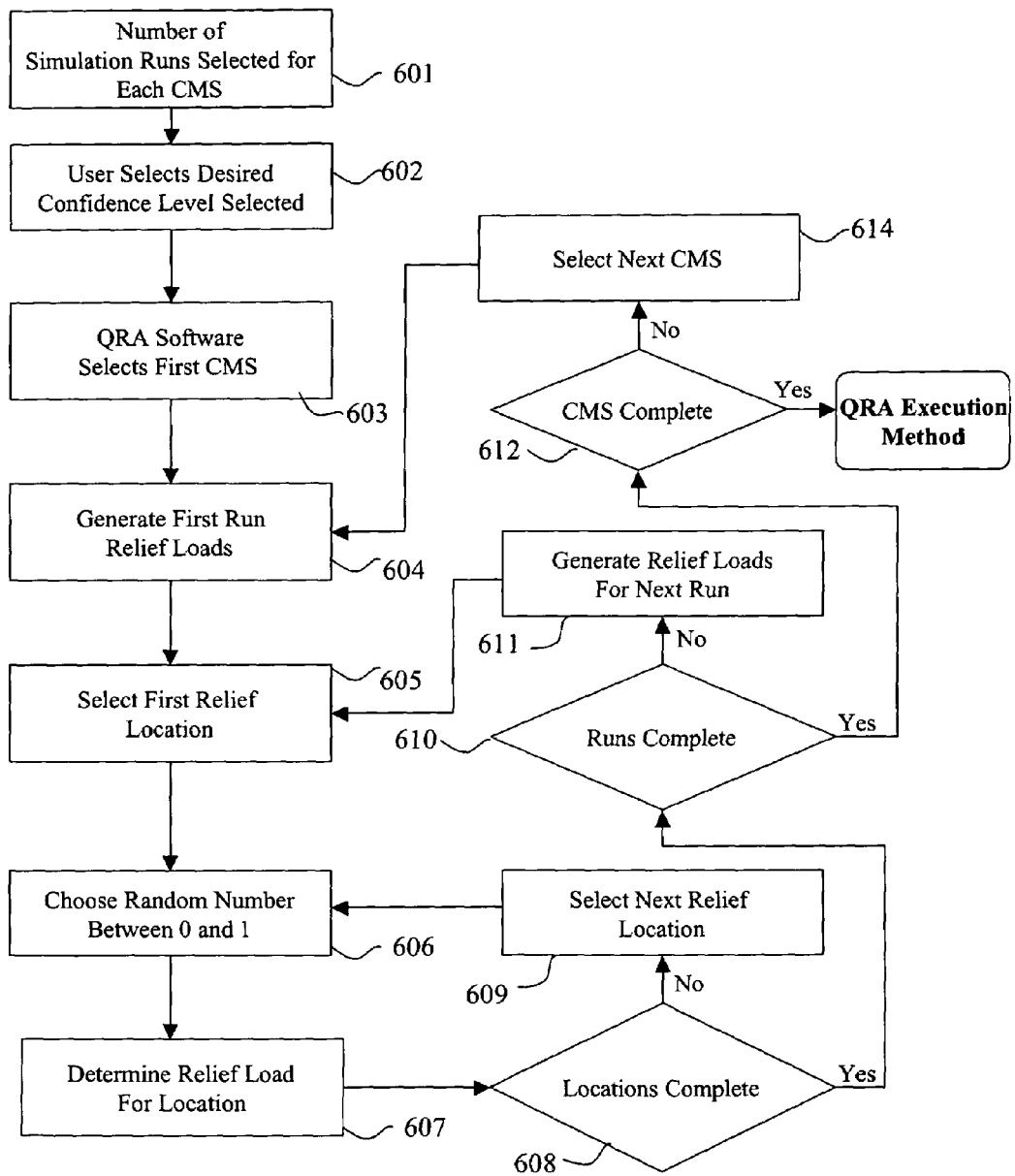
FIG. 6 is a schematic flow chart of a statistical method of reducing the number of iterations for relatively complex pressure relief systems.

FIG. 6 is a schematic flow chart of a statistical method of reducing the number of iterations for relatively complex pressure relief systems. A "Monte Carlo" execution method, known to those with ordinary skill in the art, utilizes a random number generator to develop random simulations of the relief header in the event that an identified common mode scenario occurs. For a given common mode scenario, a random number is selected at each relief location to determine the impact of the available layers of protection.

User Selects Number of Simulation Runs for Each CMS:

In step 601, the user inputs the number of Monte Carlo simulations required into the QRA program. Alternatively, the number can be programmed into the program. The number of Monte Carlo simulations required for a particular common mode scenario may be determined by various statistical methods, one of which is shown below:

$$\begin{array}{c}\text{Number of}\\\text{Simulations}\end{array} = \begin{array}{c}\text{Individual}\\\text{Risk Target}\\\text{Interval (year)}\end{array} \times \begin{array}{c}\text{Initiating}\\\text{Event}\\\text{Frequency}\\(1/\text{year})\end{array} \times 5$$

The individual risk target interval in the above equation corresponds to the accumulation range that includes the highest vessel accumulation calculated for the worst-case common mode scenario. In the event that the worst-case scenario cannot be easily selected, all possible scenarios could be hydraulically modeled to determine which common mode scenario results in the highest vessel accumulation.

The initiating event frequency used in the above equation corresponds to the worst-case common mode scenario, or the scenario that results in the highest vessel accumulation.

As one example for a general power failure, assume an initiating event frequency of 0.05/year (i.e. an interval of 20 years) and that the highest individual accumulation calculated is 85%. Based on the table shown in the above example in the QRA Input, Define Risk Acceptance Criteria section, an 85% accumulation (75%–100% range) corresponds to an individual vessel risk target interval of 500 years.

Number of simulations=500(year)*0.05(1/year)
*5=125 Monte Carlo simulations

The previous equation estimates the number of simulations required to achieve suitable results and is based on typical Monte Carlo statistical methods. The validity of this assumption is generally verified by the user as described in the Risk Evaluation Section.

User Selects Desired Confidence Level:

In step 602, the user must also input the desired confidence level for the risk evaluation of the results from the Monte Carlo simulation process. Use of the confidence level is described in the Risk Evaluation Section.

The QRA program selects the first common mode scenario and begins the process of generating the individual relief loads for each run within the first common mode scenario, as shown in step 603.

After selecting the first common mode scenario, the QRA program begins the process of generating relief loads for all individual relief locations involved in the current common mode scenario, as shown in step 604.

The QRA program generates predicted relief loads for each relief location involved in the common mode scenario starting with the first relief location, as shown in step 605.

Choose Random Number Between 0 and 1:

In step 606, the QRA program generates a random number for each relief location using an internal random number generator that outputs a random number between 0 and 1.

Determine Relief Load for Location:

In step 607, the random number generated in step 606 is used to determine the relief load for the specific location based on the overall probabilities of occurrence as calculated in step 307, FIG. 3.

In the example shown below, the overall probability of each run listed has already been determined as shown in the Overall Probability Column. The random number generated is 0.935, which falls between 0.855 and 0.95. Therefore, the Scenario 2 load of 5,000 lb/hr will be assigned to the given relief location in the QRA database.

| Possible Outcomes | Load to Relief Header | Overall Probability | Random Number |
|---|---|---|---|
| Scenario 1<br>HP Override Operates<br>Pump Auto-Start Operates | 0 lb/hr | 0.855 | 0–0.855 |
| Scenario 2<br>HP Override Operates<br>Pump Auto-Start Fails | 5,000 lb/hr | 0.095 | 0.855–0.95 |
| Scenario 3<br>HP Override Fails<br>Pump Auto-Start Operates | 35,000 lb/hr | 0.045 | 0.95–0.995 |
| Scenario 4<br>HP Override Fails<br>Pump Auto-Start Fails | 80,000 lb/hr | 0.005 | 0.995–1.0 |

The process can be repeated for every relief location in the current run and stored in the QRA database.

| Run | Random Number Generated | Predicted Relief Load |
|---|---|---|
| 1 | 0.935 | 5,000 lb/hr |
| 2 | 0.971 | 35,000 lb/hr |
| 3 | 0.382 | 0 lb/hr |
| 4 | 0.285 | 0 lb/hr |

The process of determining the relief load for individual relief locations can be repeated for each subsequent relief location until every relief location has a predicted relief load for the current run as shown in step 608. This schedule of discharges represents one random run for the common mode scenario being studied. The process is repeated as needed to generate additional random runs, as shown in the loop from steps 610 to 605.

After the current run has an output value specified for each relief location, the program checks to see if there are incomplete runs in the QRA database (those lacking predicted relief loads), as shown in step 610. If the number of runs generated is less than the number of runs specified by the user in 601, the QRA program returns to step 605, and generates another run using the previously described process.

When the number of completed runs equals the number of runs specified by the user in step 601, the program checks to determine if all common mode scenarios are complete, as shown in step 612.

If all common mode scenarios have not been completed, the QRA program returns to step 604 and completes the remaining common mode scenarios in this manner.

Figure 7:
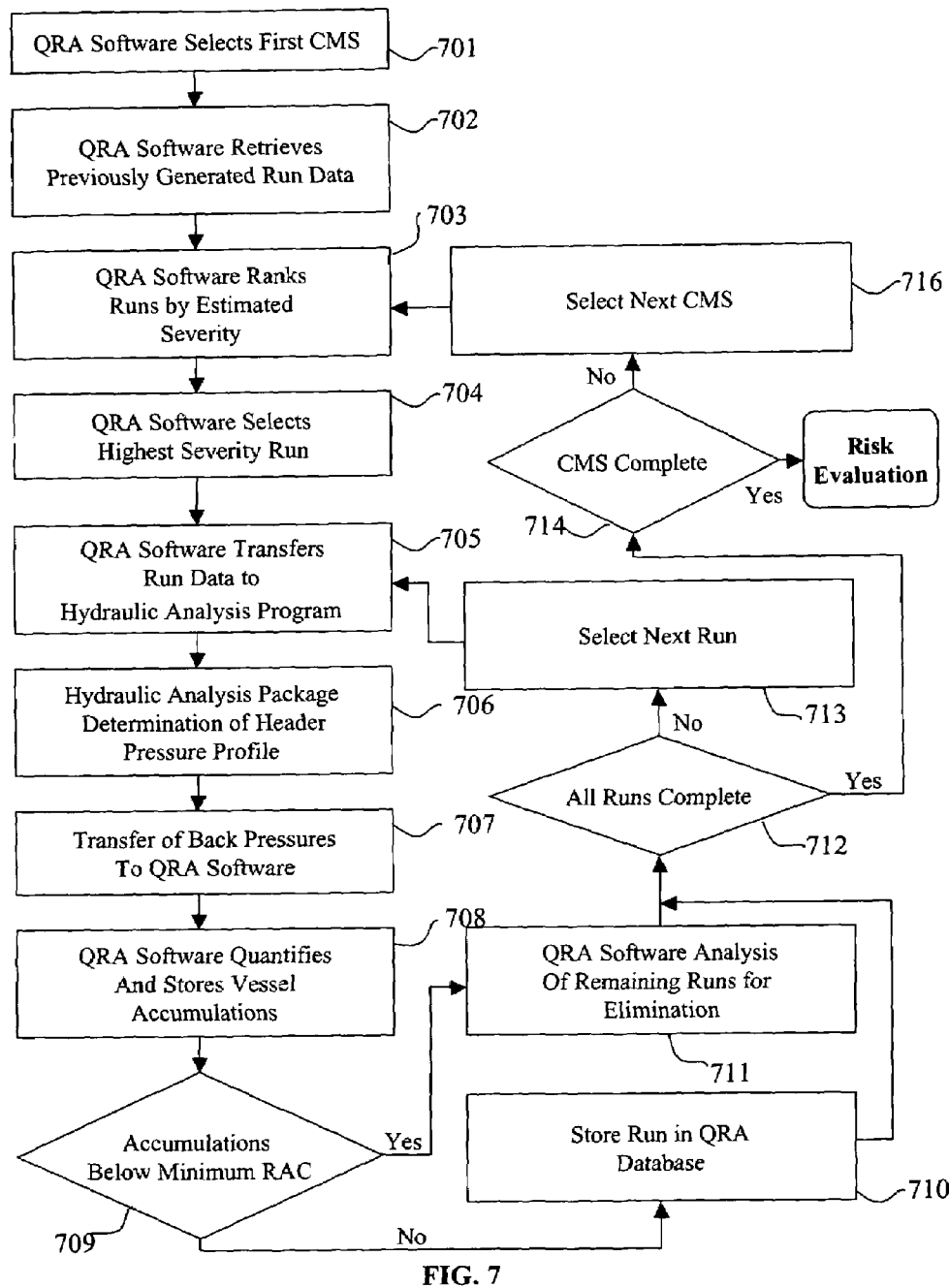
FIG. 7 is a schematic flow chart of a QRA analysis execution method.

If all of the common mode scenarios are complete, the QRA program begins the QRA Execution Method shown in FIG. 7.

QRA Execution Method

FIG. 7 is a schematic flow chart of a QRA analysis execution method.

ORA Program Selects First Common Mode Scenario (CMS):

In step 701, the QRA program selects the first common mode scenario for analysis and proceeds to step 702.

ORA Program Retrieves Previously Generated Run Data:

In step 702, the run data for the applicable common mode scenario has already been generated in steps 601–614 or step 407. The QRA program retrieves this data and proceeds to step 703.

QRA Program Ranks Runs by Estimated Severity:

In step 703, the QRA program can order or otherwise rank the run data retrieved in step 702 by the magnitude of the total relief load, which roughly approximates the expected severity of the run, relative to the other runs.

The output from the example in the Detailed Description of a Preferred Embodiment section, Generate All Runs subsection, as shown above, would be ordered as shown below:

| Run | Load at #001 | Load at #002 | Load #003 | Total Load | Run Probability |
|-----|--------------|--------------|-----------|------------|-----------------|
| 1   | 50,000       | 100,000      | 35,000    | 185,000    | 0.0001          |
| 7   | 25,000       | 100,000      | 35,000    | 160,000    | 0.0002          |
| 2   | 50,000       | 100,000      | 0         | 150,000    | 0.0004          |
| 3   | 50,000       | 60,000       | 35,000    | 145,000    | 0.005           |
| 13  | 0            | 100,000      | 35,000    | 135,000    | 0.0017          |
| 8   | 25,000       | 100,000      | 0         | 125,000    | 0.0008          |
| 9   | 25,000       | 60,000       | 35,000    | 120,000    | 0.01            |
| 4   | 50,000       | 60,000       | 0         | 110,000    | 0.02            |
| 14  | 0            | 100,000      | 0         | 100,000    | 0.0068          |
| 15  | 0            | 60,000       | 35,000    | 95,000     | 0.085           |
| 5   | 50,000       | 0            | 35,000    | 85,000     | 0.0049          |
| 10  | 25,000       | 60,000       | 0         | 85,000     | 0.04            |
| 11  | 25,000       | 0            | 35,000    | 60,000     | 0.0098          |
| 16  | 0            | 60,000       | 0         | 60,000     | 0.34            |
| 6   | 50,000       | 0            | 0         | 50,000     | 0.0196          |
| 17  | 0            | 0            | 35,000    | 35,000     | 0.0833          |
| 12  | 25,000       | 0            | 0         | 25,000     | 0.0392          |
| 18  | 0            | 0            | 0         | 0          | 0.3332          |

QRA Program Selects Highest Severity Run:

In step 704, the QRA program begins the analysis of the runs obtained in step 702 with the most severe run, as calculated in step 703.

QRA Program Transfers Run Data to Hydraulic Analysis Program:

In step 705, the QRA program transfers the relief loads and conditions via OLE automation to the relief header model constructed in step 504 in the hydraulic analysis program.

Hydraulic Analysis Program Determination of Header Pressure Profile:

In step 706, the pressure profile in the relief header is determined by solving by the hydraulic model of the relief header for the backpressures at each relief header input location. The QRA program can automate this execution.

Transfer of Back Pressures to ORA program:

In step 707, after the backpressures at each relief header input location are determined in step 706, the QRA program imports the backpressure data from the hydraulic analysis program using OLE automation. The backpressure data for each relief header input location is then stored in the QRA program.

QRA Program Quantifies and Stores Vessel Accumulations:

In step 708, from the back pressure data for each location, the corresponding vessel accumulation is calculated using standard engineering calculations that are dependent on the type of relief device present, as is known to those with ordinary skill in the art. Note that the vessel accumulations may be calculated from the backpressure using a number of different calculation methods.

Examples of typical accumulation calculations for common types of pressure safety valves (PSVs) are shown below:

Conventional PSV:

For conventional PSVs, all backpressure on the PSV (built-up back pressure plus constant back pressure) is treated as superimposed backpressure at the outlet of the PSV. As such, the relief valve will open when the differential set pressure across the valve equals the set pressure. The valve will achieve full lift at 10% overpressure. This approach can conservatively calculate the vessel accumulation by maintaining a constant differential pressure across the valve.

$$\% \text{ Accumulation} = \frac{[(P_{set} + P_{back}) + P_{set} \times 0.1] - MAWP}{MAWP} \times 100\%$$

Where:

% Accumulation=Percent vessel accumulation $P_{set}$=Set pressure of the PSV, psig $P_{back}$=Back pressure at the outlet of the PSV, psig MAWP=Maximum allowable working pressure of the protected equipment, psig Balanced Bellows PSV:

Based on a review of literature obtained from manufacturers of balanced bellows PSVs, the bellows can be conservatively estimated to remain functional at backpressures up to twice the outlet pressure ratings listed in API Standard 526 Flanged Steel Pressure Relief Valves. Above twice the listed outlet pressure rating, the bellows is assumed to fail and the relief valve is treated as a conventional valve. The QRA program can compare the backpressure, as imported from the hydraulic analysis program, to the expected bellows failure pressure and performs the corresponding calculation for vessel accumulation.

At backpressures below twice the outlet pressure rating of the bellows PSV, the bellows is expected to remain intact. Consequently, the opening pressure of the PSV will be unaffected by the backpressure. The bellows PSV achieves full lift at 10% overpressure. Per API 520 Sizing, Selection, and Installation of Pressure-Relieving Devices in Refineries, no reduction in capacity is expected at up to 30% back pressure for balanced bellows PSVs. Above 30% backpressure, the bellows valve backpressure is conservatively assumed to require the same differential pressure to remain fully open. The vessel accumulation calculation for bellows PSVs is shown below:

$$\% \text{ Accumulation} = \frac{(1.1 \cdot P_{set} - 0.3 \cdot P_{set}) + P_{back} - MAWP}{MAWP} \times 100\%$$

Where
% Accumulation=Percent vessel accumulation
$P_{set}$=Set pressure of the PSV, psig
$P_{back}$=Back pressure at the outlet of the PSV, psig
MAWP=Maximum allowable working pressure of the protected equipment, psig Pilot-Operated PSV:

The QRA program can calculate the critical flow pressure ($P_c$) based on the relief pressure ($P_R$) for the relief location and the "k" value (Cp/Cv) for the selected load from the relief location.

If the back pressure, as imported from the hydraulic analysis program, is less than or equal to the critical flow pressure, the flow through the pressure relief valve remains sonic and the capacity of the valve will not be affected. Therefore, the pressure in the equipment will not exceed the maximum allowable relief pressure, as defined in ASME Section VIII and is assumed to be the same as the relief pressure. If the backpressure is greater than the critical flow pressure, the pressure in the equipment will increase to maintain the required flow and will be calculated by the QRA program.

$$P_C = (P_R) * \left[\left(\frac{2}{k+1}\right)^{\frac{k}{k-1}}\right]$$

If BP<=$P_c$, $P_v$=$P_R$
If BP>$P_c$, $P_v$ will be calculated by the QRA program
Where:
$P_c$=Critical flow pressure, psia
$P_R$=Relief pressure for a relief location, psia
k=Ratio of heat capacities for a selected load from the location
BP=Back pressure calculated by hydraulic analysis program at a relief location, psia
$P_v$=Pressure in equipment at a relief location, psia The QRA program calculates the pressure in the equipment, $P_v$, based on a nozzle equation assuming constant flow:

$$P_V = \frac{\frac{1}{2}(BP) + \frac{1}{2}\sqrt{\left\{\begin{array}{l}(BP)^2 + 4\exp\left[\frac{1}{k}\ln\left(\frac{P_C}{P_R}\right)\right]^2(P_R)^2 - \\ 4\exp\left[\frac{1}{k}\ln\left(\frac{P_C}{P_R}\right)\right](P_R)(P_C)\end{array}\right\}}}{\exp\left\{-\ln\left[\frac{\frac{1}{2}(BP) + \frac{1}{2}\sqrt{\begin{array}{l}(BP)^2 + 4\exp\left[\frac{1}{k}\ln\left(\frac{P_C}{P_R}\right)\right]^2(P_R)^2 - \\ 4\exp\left[\frac{1}{k}\ln\left(\frac{P_C}{P_R}\right)\right](P_R)(P_C)\end{array}}}{(BP)}\right](k-1)\right\}}$$

The QRA program can then calculate the percent accumulation in the corresponding vessel:

$$\% \text{ Accumulation} = \frac{(P_V - MAWP)}{MAWP} \times 100\%$$

Where
% Accumulation=Percent vessel accumulation
$P_v$=Pressure in the equipment, psig
MAWP=Maximum allowable working pressure of the protected equipment, psig Non-Flowing Devices:

The vessel pressure is set equal to the relief header backpressure. The percent accumulation in the vessel is calculated as follows:

$$\% \text{ Accumulation} = \frac{(P_V - MAWP)}{MAWP} \times 100\%$$

Where
% Accumulation=Percent vessel accumulation
$P_v$=Pressure in the equipment, psig
MAWP=Maximum allowable working pressure of the protected equipment, psig All Accumulations Below Minimum Risk Acceptance Criteria:

In step 709, after calculating the vessel accumulations, the data is compared to the established risk acceptance criteria, as defined in step 301.

Store Run in QRA Database:

In step 710, if any of the vessel accumulations are above the minimum risk acceptance criteria (RAC), the individual relief location data for the entire run will be stored in the QRA database for further analysis. The "Vessel Accumulation Range" information will also be stored in a separate table. The "Vessel Accumulation Range" table stores the total number of runs where the vessel accumulation corresponding to a particular relief location falls between the user-defined risk target intervals.

The following table shows a portion of a sample QRA Database which stores the run data for all common mode scenarios (CMS) and the runs associated with each CMS. The backpressure on the listed relief devices has been previously imported from the hydraulic analysis program. The minimum risk acceptance criteria (RAC) for this example is 21%. The QRA program calculates the vessel % accumulation as outlined above and determines that at least one relief location exceeds the minimum RAC of 21%. Therefore, the QRA program stores the run data for each relief location.

| CMS | Run | Relief Location | Device Type | Back Pressure | Equipment Pressure | % Accumulation | Run Status |
|---|---|---|---|---|---|---|---|
| 001 | 1 | A | Conventional PSV | 45.8 psig | 110 psig | 55.8 | Keep |
| 001 | 1 | B | Conventional PSV | 14.4 psig | 220 psig | 17.2 | Keep |

-continued

| CMS | Run | Relief Location | Device Type | Back Pressure | Equipment Pressure | % Accumulation | Run Status |
|---|---|---|---|---|---|---|---|
| 001 | 1 | C | Conventional PSV | 35.2 psig | 107 psig | 46.2 | Keep |

No data was previously stored in the vessel accumulation range table in this example. The vessel accumulation data for relief locations A, B and C will be stored in the "Vessel Accumulation Range" table as follows:

| CMS | Relief Location | From % Accumulation | Up To % Accumulation | Run Count |
|---|---|---|---|---|
| 001 | A | 50 | 75 | 1 |
| 001 | B | 0 | 21 | 1 |
| 001 | C | 30 | 50 | 1 |

Note that the vessel accumulation range data is stored for each run, even if all of the vessel accumulations are below the minimum RAC (the vessel accumulation range from 0% to 21% will be incremented by one for all relief locations).

QRA Program Analysis of Remaining Runs for "Elimination":

In step 711, for the current run, if the vessel accumulations for all equipment connected to the relief header are lower than the minimum accumulation listed in the risk acceptance criteria (i.e. all calculated accumulations are acceptable at any frequency), then an algorithm is implemented to count less severe runs without utilizing the hydraulic analysis package in order to increase the speed of the QRA program execution. This "elimination" algorithm counts in the "Vessel Accumulation Table" the remaining runs which have relief loads equal to or less than in the current run without running utilizing the hydraulic analysis program. Note that the elimination algorithm only evaluates runs where the same specific relief locations or fewer are expected to discharge.

For example, in the following table, run 15 was evaluated and all vessel accumulations were found to be below the minimum RAC. Therefore, the elimination algorithm would evaluate the remaining runs (those below run 15 in the table below) and "eliminate" any of runs that result in less than or equal to 0 lb/hr, 60,000 lb/hr and 35,000 lb/hr at relief locations #001, #002 and #003, respectively. Note that in this example, runs 16, 17 and 18 would be "eliminated", as shown in the table below:

| Run | Load at #001 | Load at #002 | Load #003 | Total Load |
|---|---|---|---|---|
| 1 | 50,000 | 100,000 | 35,000 | 185,000 |
| 7 | 25,000 | 100,000 | 35,000 | 160,000 |
| 2 | 50,000 | 100,000 | 0 | 150,000 |
| 3 | 50,000 | 60,000 | 35,000 | 145,000 |
| 13 | 0 | 100,000 | 35,000 | 135,000 |
| 8 | 25,000 | 100,000 | 0 | 125,000 |
| 9 | 25,000 | 60,000 | 35,000 | 120,000 |
| 4 | 50,000 | 60,000 | 0 | 110,000 |
| 14 | 0 | 100,000 | 0 | 100,000 |
| 15 | 0 | 60,000 | 35,000 | 95,000 |
| 5 | 50,000 | 0 | 35,000 | 85,000 |
| 10 | 25,000 | 60,000 | 0 | 85,000 |
| 11 | 25,000 | 0 | 35,000 | 60,000 |
| 16 | 0 | 60,000 | 0 | 60,000 |
| 6 | 50,000 | 0 | 0 | 50,000 |
| 17 | 0 | 0 | 35,000 | 35,000 |
| 12 | 25,000 | 0 | 0 | 25,000 |
| 18 | 0 | 0 | 0 | 0 |

In step 712, the QRA program then determines if all runs retrieved in step 702, are complete.

In step 713, if all runs are not complete for the current common mode scenario, the QRA program selects the next run, and proceeds to transfer the relief loads for the run into the hydraulic analysis program as shown in step 705.

In step 714, the QRA program determines if all runs have been completed for the current common mode.

In step 716, if all common mode scenarios are not complete, the QRA program selects the next common mode scenario and proceeds to rank the runs in the next common mode scenario, as shown in 703.

If all common mode scenarios are complete, the QRA program proceeds to the Risk Evaluation section.

Risk Evaluation

Figure 8:
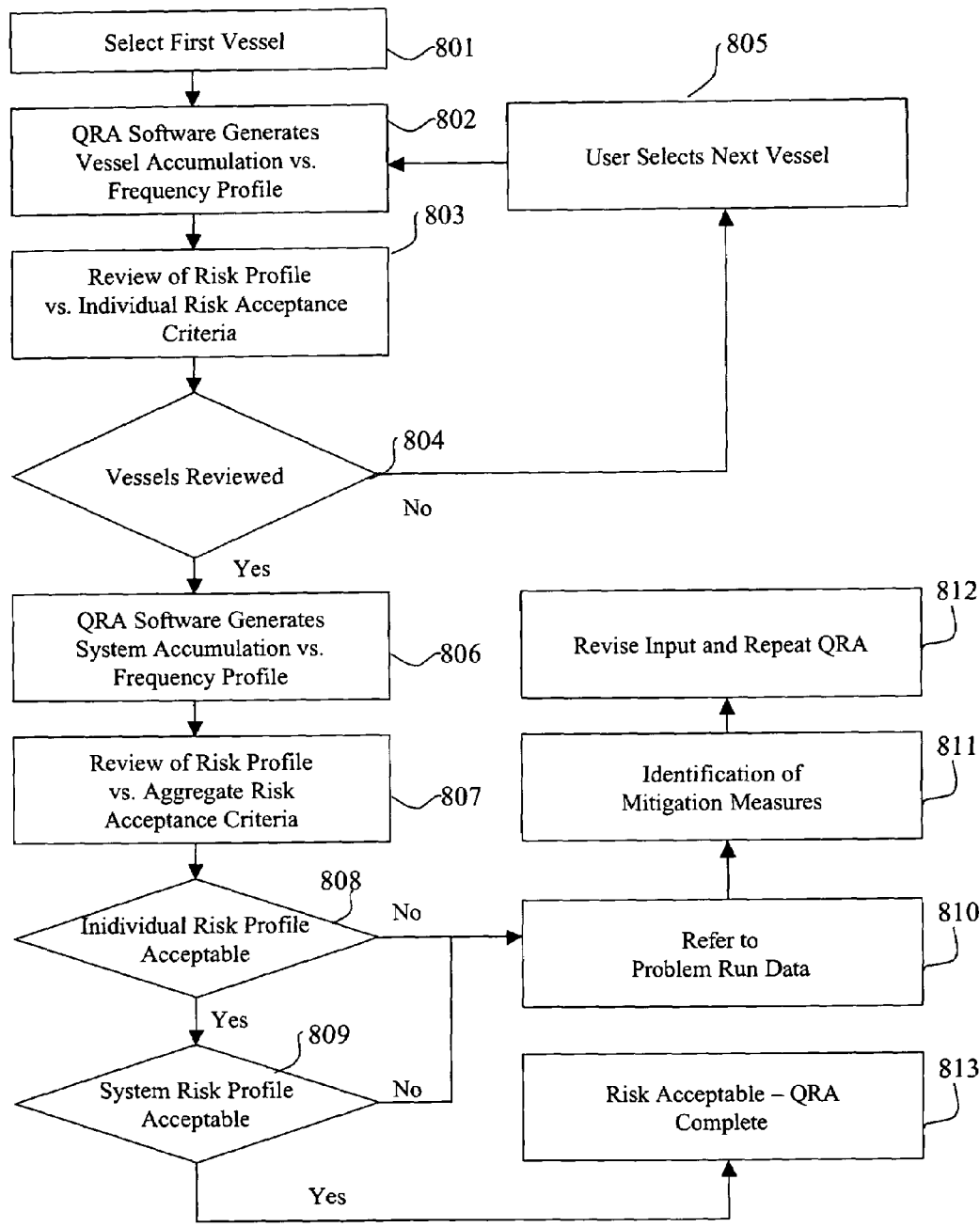
FIG. 8 is a schematic flow chart of the QRA risk evaluation.

FIG. 8 is a schematic flow chart of the QRA risk evaluation. The QRA program can generate many specific reports, but the primary output is a summary of the vessel accumulation versus frequency relationship developed for all individual vessels included in the relief header network as compared to the risk acceptance criteria. The risk analysis can be performed for specific vessels or common mode scenarios, but the general approach would be to ensure that the individual risk acceptance criteria is met for each vessel and the aggregate risk acceptance criteria is met for the overall system. The recommended process for making this determination is shown in the Risk Evaluation flow chart of FIG. 8.

The user begins the process by selecting the first vessel to review, as shown in step 801.

QRA Program Generates Vessel Accumulation vs. Frequency Profile:

In step 802, the QRA program then develops the individual risk profile for the vessel based on the stored run data. This is accomplished in different ways depending on the method chosen to perform the analysis in step 406, FIG. 4. The different methods corresponding to direct execution of all runs and Monte Carlo simulation are described below.

Risk Profile Development for Direct Execution of all Runs

In the event that all possible runs have been previously analyzed, the quantification of the vessel risk profile is developed based on the results for each run and the associated run probability. As described in step 710, FIG. 7, these accumulations are counted in ranges that correspond to the user-specified individual risk acceptance criteria.

Using the QRA Program Ranks Runs by Estimated Severity example above, which had 18 different possible runs that resulted in different accumulations for the vessel of interest and assuming that the initiating event frequency for this common mode scenario (CMS 1) is once every 10 years, the profile can be developed as shown below:

| Run | 0–21% | 21–30% | 30–50% | 50–75% | 75–100% | 100–150% | 150–200% | Run Probability |
|---|---|---|---|---|---|---|---|---|
| 1 | | | | | | X | | 0.0001 |
| 2 | | | X | | | | | 0.0004 |
| 3 | X | | | | | | | 0.005 |
| 4 | X | | | | | | | 0.02 |
| 5 | | | X | | | | | 0.0049 |
| 6 | X | | | | | | | 0.0196 |
| 7 | | | | | X | | | 0.0002 |
| 8 | X | | | | | | | 0.0008 |
| 9 | X | | | | | | | 0.01 |
| 10 | X | | | | | | | 0.04 |
| 11 | | X | | | | | | 0.0098 |
| 12 | X | | | | | | | 0.0392 |
| 13 | | | | X | | | | 0.0017 |
| 14 | | X | | | | | | 0.0068 |
| 15 | X | | | | | | | 0.085 |
| 16 | X | | | | | | | 0.34 |
| 17 | X | | | | | | | 0.0833 |
| 18 | X | | | | | | | 0.3332 |
| Total | | | | | | | | 1.0000 |

The probability of occurrence for each accumulation range is determined as the sum of the run probabilities that resulted in that level of accumulation. For the 30–50% vessel accumulation range shown above, the probability of occurrence would be 0.0021 which means 0.21% of the time that this common mode scenario occurs, the accumulation could be expected to fall between 30% and 50% for the vessel under consideration. The frequency is then obtained by multiplying the probability by the common mode scenario event frequency (occurrences per year). For the 30–50% accumulation range, this would result in (0.0021)×(0.1)(which is the reciprocal a ten year interval) or 0.00021 which corresponds to once every 4,762 years.

The data shown in the above table would be summarized by vessel accumulation range as follows:

| Accumulation Range | Probability | Years Between Occurrence |
|---|---|---|
| 0–21% | 0.9761 | 10.2 |
| 21–30% | 0.0215 | 465 |
| 30–50% | 0.0021 | 4761 |
| 50–75% | 0.0002 | 50,000 |
| 75–100% | 0.0001 | 100,000 |
| 100% and above | 0 | N/A |
| Total | 1.0000 | |

However, the risk acceptance criteria is presented on a cumulative basis, so the frequency that the accumulation will exceed 21% includes input from all higher accumulation ranges. So, the probability of an accumulation higher than 21% is given by 0.0215+0.0021+0.0002+0.0001=0.0239 that results in 418 years between occurrences. The cumulative years between occurrences is summarized in the table below.

| Accumulation Exceeds | Probability | Years Between Occurrence |
|---|---|---|
| 21% | 0.0239 | 418 |
| 30% | 0.0024 | 4167 |
| 50% | 0.0003 | 33,333 |
| 75% | 0.0001 | 100,000 |
| 100% | 0 | N/A |

This process is repeated for each common mode scenario of interest. The data for all common mode scenarios can then be combined to yield the overall risk profile for the vessel of interest. This is accomplished by adding the frequencies (inverse of years between occurrence) for each accumulation level. This methodology can be demonstrated by assuming that only one other common mode scenario (CMS #2) that has a initiating event frequency of once every 20 years is present. After repeating the above process a similar cumulative risk table is generated for CMS #2 as shown below.

| Accumulation Exceeds | Probability | Years Between Occurrence |
|---|---|---|
| 21% | 0.64 | 31.25 |
| 30% | 0.2 | 100 |
| 50% | 0.1 | 200 |
| 75% | 0.05 | 400 |
| 100% | 0.01 | 2,000 |
| 150% | 0 | N/A |

Combining CMS #1 and CMS #2, the overall cumulative risk profile for the vessel under consideration is developed as described above and can be compared to the established individual risk acceptance criteria.

| Accumulation Exceeds | Calculated Years Between Occurrence | Individual Risk Acceptance Criteria |
|---|---|---|
| 21% | 29 | 1 |
| 30% | 98 | 20 |
| 50% | 199 | 50 |

-continued

| Accumulation Exceeds | Calculated Years Between Occurrence | Individual Risk Acceptance Criteria |
|---|---|---|
| 75% | 398 | 100 |
| 100% | 2,000 | 500 |
| 150% | N/A | 1,000 |

For the vessel analyzed above, it can be seen that the calculated years between occurrence is greater than the Individual Risk Acceptance Criteria at all accumulation limits; therefore, this vessel meets the acceptance criteria, as shown in step 803. The process is repeated for each vessel in the system, as shown in step 804.

Risk Profile Development for Monte Carlo Method

In the event that the Monte Carlo methodology is used, the quantification of the vessel risk profile must be developed in a different manner as the probability of each random run is not known. As described in the QRA Execution Method section, the accumulations for each random run are placed in vessel accumulation ranges that correspond to the user-specified individual risk acceptance criteria. For a given vessel and common mode scenario, the data from the QRA Execution Section will be retained.

For example, assume that 10,000 runs were performed for a common mode scenario (CMS #1) with an initiating event frequency of 0.1 (10 years between occurrences). The raw data from the QRA Execution Section would take the form of the table below:

| Accumulation Range | Run Count |
|---|---|
| 0–21% | 7,850 |
| 21–30% | 1,500 |
| 30–50% | 500 |
| 50–75% | 100 |
| 75–100% | 50 |
| 100% and above | 0 |
| Total | 10,000 |

As stated above, the risk acceptance criteria is input on a cumulative basis; therefore, this data is converted in a similar fashion as for the direct execution method. To determine the cumulative number of simulations that exceeded 21% accumulation, the number of simulations in all the accumulation ranges above 21%–30% are added to the 21%–30% accumulation range total (1,500+500+100+50=2,150). The probability of at each accumulation limit is then simply the number of simulations divided by the total number of simulations run. As such, the probability of exceeding 21% accumulation is determined to be 2,150/10,000 or 0.215 and the Years Between Occurrence is calculated in the same way as for the direct execution of all runs method.

| Vessel Accumulation Exceeds | Number of Simulations | Probability | Years Between Occurrence |
|---|---|---|---|
| 21% | 2,150 | 0.215 | 46.5 |
| 30% | 650 | 0.065 | 154 |
| 50% | 150 | 0.015 | 667 |
| 75% | 50 | 0.005 | 2,000 |
| 100% | 0 | 0 | N/A |

One complication with the Monte Carlo method is that the Years Between Occurrence calculated above is an estimated value based on the user-specified number of simulations. If it were possible to run the model in this manner an infinite number of times, the error in the reported Years Between Occurrence would go to zero; however, this is frequently not feasible. As such, statistical methods can be applied to determine the low and high limits of the report Years Between Occurrence based on the user desired confidence level.

In one embodiment, the QRA program uses the recognized "Chi-Squared" method to determine the upper and lower limits based on the confidence level specified. This method is reported in Chapter 11 of "Essentials of Statistics for Scientists and Technologists" by Cornelius Mack, but is also available in most statistics textbooks.

$$\chi^2 = \frac{(s_0 - np)^2}{np(1 - p)}$$

Where:
n=total number of runs
$S_0$=total observed occurrences in accumulation range
p=probability
$^2$=value of "Chi Square" function The value of the "Chi Square" function is determined from published tables based on the number of accumulation ranges and the user-specified confidence level. Once "Chi Square" is known, the two values of p that satisfy the above equation can be solved for using the quadratic equation. These two values represent estimates of the upper and lower limits between which the user can be confident (to the specified degree) that the actual answer will be found.

In the example above, the number of populated accumulation ranges is 4 and a 95% confidence level is desired by the user. From published "Chi Square" tables, the value of Chi Square is found to be 7.81. The upper and lower confidence limits are then obtained using the equation above and solving using the quadratic equation.

$$7.81 = \frac{(2,150 - 10,000p)^2}{10,000p(1 - p)}$$

Where:
n=total number of runs (10,000)
$S_0$=total observed occurrences in accumulation range (2,150)
p=probability
$^2$=value of "Chi Square" function (7.81)

In this example, the two values of p that were found to satisfy the equation are 0.2037 and 0.2267. The process is repeated for each accumulation range to yield the following table.

| Vessel Accumulation Exceeds | Lower Limit of Probability at 95% Confidence | Calculated Probability | Upper Limit of Probability at 95% Confidence Level |
|---|---|---|---|
| 21% | 0.204 | 0.215 | 0.227 |
| 30% | 0.058 | 0.065 | 0.072 |
| 50% | 0.012 | 0.015 | 0.019 |
| 75% | 0.0034 | 0.005 | 0.0074 |

The years between occurrences can then be quantified in the same manner at the lower and upper limits of the confidence interval as shown below.

| Vessel Accumulation Exceeds | Maximum Years Between Occurrence at 95% Confidence | Calculated Years Between Occurrence at 95% Confidence | Minimum Years Between Occurrence at 95% Confidence Level |
|---|---|---|---|
| 21% | 49 | 47 | 44 |
| 30% | 172 | 154 | 139 |
| 50% | 833 | 667 | 526 |
| 75% | 2,941 | 2,000 | 1,351 |

As the objective is to ensure that the risk acceptance criteria is met within the specified confidence level, the upper limit of probability (minimum number of years between occurrences at a user-specified confidence level) becomes the calculated value that is compared to the risk acceptance criteria to determine acceptability, as shown below.

| Accumulation Exceeds | Minimum Years Between Occurrence at 95% Confidence Level | Individual Risk Acceptance Criteria |
|---|---|---|
| 21% | 44 | 1 |
| 30% | 139 | 20 |
| 50% | 526 | 50 |
| 75% | 1,351 | 100 |

This process is repeated for each common mode scenario of interest. The data for all common mode scenarios can then be combined to yield the overall risk profile for the vessel of interest. This is accomplished by adding the frequencies (inverse of years between occurrence) for each accumulation range.

For the vessel analyzed above, it can be seen that the minimum years between occurrence is greater than the individual risk acceptance criteria at all accumulation limits; therefore this vessel meets the acceptance criteria, as shown in step 803. The process can repeated for each vessel in the system, as shown by the loop from step 804 to step 805 to step 802.

Upon completion of the review of each vessel as compared to the individual risk acceptance criteria, as shown in step 803, the QRA program can be used to determine the overall system risk step 806 by combining the results for each individual vessel. This is done in a similar way as the combination of results for different common mode scenarios for a single vessel only in this run. The overall frequencies (inverse of years between occurrence) for every vessel are summed to determine the overall expected frequency that each accumulation limit will be exceeded. In the case of Monte Carlo analysis, the minimum, calculated, and maximum frequencies are summed to yield overall minimum, calculated, and maximum frequencies. The overall system risk profile can be reviewed by the user in a similar manner as the individual vessel profiles with the comparison being made against the established aggregate risk acceptance criteria, as shown in step 807.

By comparison of each vessel to the individual risk acceptance criteria, as shown in step 808 and the comparison of the overall system to the aggregate risk acceptance criteria, as shown in step 809, the determination of acceptability can be made. In the event that one or more vessels or the system does not meet the established risk criteria, the QRA program provides reports on a vessel or system basis that detail the runs that contributed most to the risk, as shown in step 810. A review of these reports can be conducted by the user to determine the most cost-effective mitigation measures, as shown in step 811. Potential mitigation measures that are generally considered include installation of additional layers of protection, increasing instrumentation reliability or making physical modifications to the system. The QRA program provides the input required by an experienced engineer to make these judgments. Upon selection of mitigation steps, the QRA can be performed again based on the proposed modifications, as shown in step 812.

If all established risk acceptance criteria are met, then the risk associated with the system is found to be acceptable and no further analysis or modification is required, as shown in step 813.

QRA Calculation Method

Figure 9:
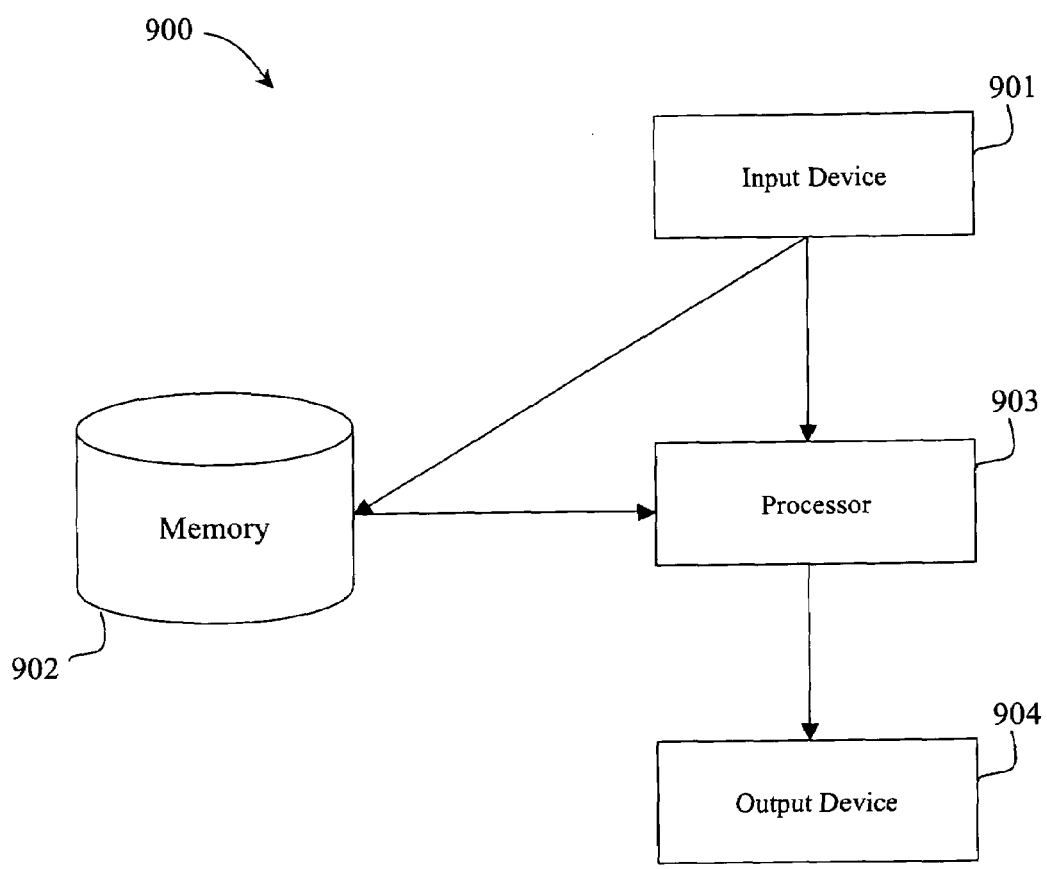
FIG. 9 is a schematic flow chart of the calculation process used by the QRA process.

FIG. 9 is a schematic flowchart of a system 900 for assessing the risks described herein. The system 900 can include a calculator, handheld computer, personal computer, microcomputer, mainframe, super computer, or any other electronic calculating element. The individual elements may be contained within a unitary case or may be separated from each other in a network system, including a wide area network.

An input device 901 can be used to input data into the system 901. The input device can include, for example and without limitation, keyboards, microphones, touch screens, electronic, visual, audible, sensory input, output from other systems and any other element for inputting data.

The input device is generally coupled to a memory 902 for temporarily and/or permanently storing the input data and a processor 903. Further, the memory 902 can store programs represented by various flowcharts, such as FIGS. 1–8, to generate the risk assessments described herein. The memory 902 can be any form of storage media and can include without limitation hard disk drives, RAM, removable media, ROM, and other forms of storage devices. The memory can be unitary or can be separate elements that collectively are used to store data, store programs, and store output from processing the input data with the programs.

The memory 902 is generally coupled to a processor 903. The processor 903 is used to execute the programs and associated data described herein and to generate output from the execution of the programs. The memory 902 can be physically coupled to the processor 903 or can be remotely coupled to the processor by electronic, microwave, infrared or any other form of communication. Further, the processor itself may have a memory and such memory is herein specifically represented within the term "memory" 902.

An output device 904 can be used to output any data generated using the memory 902 in conjunction with the data and programs stored therein and the processor 903. The output device 904 can be include, without limitation, visual output, such as visual images and/or text on a monitor or print media, audible output, tactile output, or electronic output that can be coupled to other systems, programs, or controllers (not shown).

While the foregoing is directed to various embodiments of the present invention, other and further embodiments may be devised without departing from the basic scope thereof. For example, various methods can be included in combination with each other to produce other variations of the disclosed embodiments. The order of steps could be varied, combined, or split into multiple steps. Further, the examples used herein are merely for illustration of the underlying description and are no limiting. The values, scenarios, equipment, and other input and output data can vary depending on the pressure relief system(s) analyzed. Further, any headings herein are for the convenience of the reader and are not intended to limit the scope of the invention.

We claim:

1. A method implementable with a computer system of assessing risks to pressure equipment associated with at least one pressure relief system having a relief header, comprising:
   a. identifying in the computer system one or more relief header inputs associated with the equipment;
   b. identifying in the computer system one or more common mode failure scenarios for the relief header inputs;
   c. calculating with the computer system a first hydraulic model for the one or more common mode failure scenarios;
   d. defining in the computer system a risk acceptance criteria for an accumulation in one or more members of the equipment associated with the relief header inputs;
   e. defining in the computer system initiating events frequency of occurrence for one or more common mode failure scenarios;
   f. determining with the computer system whether at least one of the risk acceptance criteria is not met by the first hydraulic model to assess risk to the equipment;
   g. defining in the computer system a probability of failure for one or more protection systems associated with the equipment; and
   h. calculating with the computer system an output that assess risk to the equipment by correlating an accumulation of the one or more members of the equipment with the frequency of occurrence.

2. The method of claim 1, further comprising comparing with the computer system the output with the risk of acceptance criteria.

3. The method of claim 2, further comprising adjusting the equipment, protective systems, or a combination thereof to produce an output within the risk of acceptance criteria.

4. The method of claim 1, wherein calculating an output comprises:
   a. calculating with the computer system a value for a number of possible permutations of relief loads for the relief header inputs and common mode failure scenarios; and
   b. determining with the computer system whether to solve the possible relief loads based on the value by sampling techniques.

5. The method of claim 4, further comprising solving the possible relief loads by sampling techniques, comprising:
   a. generating with the computer system a random number for at least one of the relief header inputs;
   b. using with the computer system the random number to categorize which protection system is predicted to fail;
   c. calculating with the computer system a variety of predicted relief loads for the relief header inputs based on the categorization of the predicted failure; and
   d. repeating with the computer system the generation of a random number and categorization for a predetermined number of simulations.

6. The method of claim 5, further comprising ranking with the computer system the predicted relief loads based on the equipment accumulation and analyzing with the computer system the loads until a pre-determined value of reliability is met.

7. The method of claim 6, wherein the value of reliability is statistically determined.

8. The method of claim 5, further comprising repeating with the computer system the generation of the random number and the categorization of the predicted failure for each relief header input.

9. The method of claim 1, wherein calculating with the computer system the output by correlating the equipment accumulation occurs for each relief header input.

10. The method of claim 1, wherein calculating with the computer system the output by correlating the equipment accumulation occurs for one or more groups of relief header inputs.

11. The method of claim 1, further comprising determining with the computer system the probability of failure for each type of protection system and calculating with the computer system a probability of failure for each relief header input having one or more of the protection systems.

12. The method of claim 11, further comprising determining with the computer system the frequency of occurrence for a combination of protection systems associated with each relief header input.

13. The method of claim 1, further comprising identifying in the computer system a plurality of common mode failure scenarios and using the probability of failure for each protection system and the initiating event frequency for each common mode failure scenario to develop with the computer system an output of an equipment accumulation compared to the frequency of occurrence.

14. The method of claim 13, further comprising comparing the output to determine with the computer system whether the risk acceptance criteria is within an acceptable predetermined value for one or more specific members of the equipment associated with the pressure relief system.

15. The method of claim 13, further comprising combining the output of the equipment accumulation compared to the frequency of occurrence for a plurality of members of the equipment associated with the pressure relief system to determine with the computer system an overall risk for the equipment.

16. The method of claim 14, further comprising determining with the computer system the frequency of occurrence for a combination of protection systems associated with each relief header input.

17. The method of claim 16, further comprising comparing the output to determine with the computer system whether the risk acceptance criteria is within an acceptable predetermined value.

18. A method implementable with a computer system of assessing risks to pressure equipment associated with at least one pressure relief system having a relief header, comprising:
   a. identifying in the computer system one or more relief header inputs associated with the equipment;

b. identifying in the computer system at least one common mode failure scenario for the relief header inputs;

c. calculating in the computer system a first hydraulic model for the at least one common mode failure scenario;

d. defining in the computer system a risk acceptance criteria for an accumulation in the equipment associated with the relief header inputs;

e. defining in the computer system initiating events frequency of occurrence for the at least one common mode scenario;

f. determining with the computer system whether the risk acceptance criteria are met by the first hydraulic model to assess risk to the equipment.

19. The method of claim 18, wherein the acceptance criteria are not met by the first hydraulic mode, and wherein the method further comprises:

a. defining in the computer system a probability of failure for one or more protection systems associated with the equipment; and b. calculating with the computer system an output that assess risk to the equipment by correlating an accumulation of one or more members of the equipment with the frequency of occurrence.

20. A system for assessing risks to pressure equipment associated with at least one pressure relief system having a relief header, comprising:

a. an electronic processor;

b. a memory coupled to the electronic processor, the memory containing one or more programs to be processed by the electronic processor, the one or more programs being adapted to:

i. use input data for:

a. identified relief header inputs;

b. identified common mode failure scenarios for the relief header inputs;

c. defined risk acceptance criteria for an accumulation in the equipment associated with the relief header inputs;

d. defined initiating events frequency of occurrences for the common mode scenarios; and e. defined probability of failure for one or more protection systems coupled to one or more of the relief header inputs;

ii. calculate a first hydraulic model for at least one of the common mode failure scenarios;

iii. automatically calculate probability of failures for combinations of protection systems associated with the relief header inputs; and iv. automatically correlate an accumulation of one or more members of the equipment with the frequency of occurrences; and c. an output element coupled to the memory for producing an output of the correlation of the accumulation of one or more members of the equipment with the frequency of occurrences.

21. The system of claim 20, wherein the one or more programs are further adapted to automatically calculate a value for a number of possible permutations of relief loads for the relief header inputs and common mode failure scenarios for a group of relief header inputs.

22. The system of claim 21, wherein the one or more programs are further adapted to:

a. generate a random number for at least one of the relief header inputs;

b. use the random number to categorize which protection system is predicted to fail;

c. calculate a variety of predicted relief loads for the relief header inputs based on the categorization of the protected failure; and d. automatically repeat the generation of a random number and categorization for a predetermined number of simulations.

23. A method implementable with a computer system of assessing risks to pressure equipment associated with at least one pressure relief system having a relief header, comprising:

a. identifying in the computer system a plurality of relief header input associated with the pressure equipment;

b. identifying in the computer system a common mode failure scenario for the plurality of relief header inputs;

c. calculating with the computer system a first hydraulic model for the common mode failure scenario;

d. defining in the computer system a risk acceptance criteria for an accumulation in the pressure equipment associated with the plurality of relief header inputs; and e. determining with the computer system whether the risk acceptance criteria are met by the first hydraulic model to assess risk to the equipment.

24. The method of claim 23, wherein the risk acceptance criteria are not met by the first hydraulic mode and the method further comprises the steps of:

a. defining in the computer system event frequency of occurrence for the common mode failure scenario; and b. calculating with the computer system an output that assess risk to the equipment by correlating an accumulation of one or more members of the pressure equipment with the frequency of occurrence.

25. A system for assessing risks to pressure equipment associated with a relief system having a relief header, comprising:

a. an electronic processor;

b. a memory coupled to the electronic processor, the memory containing one or more programs to be processed by the electronic processor, the one or more programs being adapted to:

i. use input data for:

a. identified relief header inputs;

b. identified common mode failure scenarios for the relief header inputs;

c. defined risk acceptance criteria for an accumulation in the equipment associated with the relief header inputs; and d. defined initiating events frequency of occurrences for the common mode scenarios;

ii. calculate a first hydraulic model for at least one of the common mode failure scenarios; and iii. automatically correlate an accumulation of one or more members of the equipment with the frequency of occurrences; and c. an output element coupled to the memory for producing an output of the correlation of the accumulation of one or more members of the equipment with the frequency of occurrences.

* * * * *